United States Patent
Eustace et al.

(10) Patent No.: US 6,689,840 B1
(45) Date of Patent: Feb. 10, 2004

(54) WEATHERING RESISTANCE OF POLYMERIC MATERIALS

(75) Inventors: Paul Eustace, Stockton-on-Tees (GB); Neil Andrew McCathy, Middlesbrough (GB); Nicholas John Marston, Middlesbrough (GB)

(73) Assignee: Lucite International UK Limited, Southampton (GB)

( * ) Notice: Subject to any disclaimer, the term of this patent is extended or adjusted under 35 U.S.C. 154(b) by 0 days.

(21) Appl. No.: 09/980,395

(22) PCT Filed: Jun. 2, 2000

(86) PCT No.: PCT/GB00/02142
§ 371 (c)(1),
(2), (4) Date: Feb. 28, 2002

(87) PCT Pub. No.: WO00/75222
PCT Pub. Date: Dec. 14, 2000

(30) Foreign Application Priority Data

Jun. 4, 1999 (GB) .............................................. 9912974
Sep. 23, 1999 (GB) .............................................. 9922485

(51) Int. Cl.[7] .......................... C08L 27/06; C08L 27/08; C08L 33/08; C08L 33/12; C08K 3/20
(52) U.S. Cl. ....................... 525/213; 525/222; 525/224; 524/401; 524/409; 524/436; 524/437; 526/319; 526/343; 526/344
(58) Field of Search ............................... 526/343, 344, 526/319; 524/430, 357, 399, 400, 425, 432, 433, 436, 401, 409, 437; 525/213, 222, 224

(56) References Cited

U.S. PATENT DOCUMENTS

| | | |
|---|---|---|
| 4,595,724 A | 6/1986 | Koblitz |
| 5,133,899 A | 7/1992 | Nakazawa et al. |
| 5,612,413 A | 3/1997 | Rozkuszka et al. |
| 5,726,234 A * | 3/1998 | Herbst et al. ............... 524/430 |

FOREIGN PATENT DOCUMENTS

| | | |
|---|---|---|
| DE | 29 37 482 | 3/1980 |
| EP | 0 432 495 | 6/1991 |
| EP | 0784077 A1 | 7/1997 |
| EP | 0 700 965 B1 | 5/1998 |
| EP | 0857757 A1 | 8/1998 |
| EP | 1013713 A | 6/2000 |
| EP | 0 781 800 B1 | 5/2003 |
| GB | 1054877 * | 1/1967 |
| WO | WO 00/37557 | 6/2000 |
| WO | WO 00/75227 | 6/2000 |

OTHER PUBLICATIONS

English–language Abstract : JP 5807047 date: May 12, 1983, Shiyunji et al.

English–language Abstract: JP 5008455 date: Jul. 17, 1975, Matsushita.

English–language Abstract: HU P8301879A date: Aug. 28, 1987.

English–language Abstract: HU P9005458A date Mar. 30, 1992.

* cited by examiner

Primary Examiner—Robert D. Harlan
(74) Attorney, Agent, or Firm—Venable LLP; Marina V. Schneller

(57) ABSTRACT

A polymeric material containing a halogen-containing polymer such as PVC, an inorganic hydroxide and, an acrylic material is described. The presence of the inorganic hydroxide provides a material of superior weathering resistance as compared to materials comprising halogen-containing polymers which do not contain hydroxide.

36 Claims, No Drawings

WEATHERING RESISTANCE OF POLYMERIC MATERIALS

This invention relates to polymeric materials having improved weathering resistance. Particularly, although not exclusively, the invention relates to polymeric materials which include a halogen-containing polymer and, especially, to polymeric materials which include both a halogen-containing polymer and an acrylic polymer.

Halogen-containing polymers, for example, polyvinyl chloride (PVC) are relatively cheap and readily available materials. They have been used outdoors in buildings and glazing. However, the weatherability, for example the light stability of halogen-containing polymers is poor, leading to relatively short lifetimes particularly in pigmented formulations.

Acrylic materials are used in a variety of applications, for example buildings, including glazing, automotive lights, instrument dials, light diffusers, lenses, medical diagnostic devices, signs, bath/sanitary ware, because of their toughness, weatherability, appearance and stability characteristics. They may be used as capstock material to provide a coating layer over a substrate thermoplastic material and hence impart the advantageous properties of acrylic compounds to the underlying thermoplastic material. One example of the use of acrylic materials as capstocks is described in U.S. Pat. No. 5,318,737 in which suitable acrylic compositions for coextrusion with acrylonitrile-butadiene-styrene (ABS) are described for a variety of end-uses.

In many application areas the retention of beneficial properties following exposure to sunlight etc is important. Acrylic materials themselves generally have exceptional weathering performance and when formulated correctly can be used to impart these properties to underlying plastics materials. Blends of PVC and acrylic materials may be attractive in some situations. For example, compared to unmodified acrylics, acrylics modified by addition of PVC may be cheaper, have increased toughness, exhibit reduced flammability and have desireable melt-flow properties. However, whilst the weathering performance of an acrylic/PVC blend is generally improved compared to the PVC alone, the addition of PVC to acrylics reduces the weathering performance compared to unmodified acrylics. Thus, an acrylics/PVC blend may exhibit unacceptable colour stability, degradation in appearance and mechanical properties following exposure to sunlight or in weathering tests. In fact, unmodified pigmented acrylic/PVC blends behave similarly to PVC itself in that they begin to lighten ("chalk") after several thousands hours accelerated weathering exposure in both xeno and QUV A machines. The "chalking" phenomenon is well known to those skilled in the art of PVC material formulation and generally manifests itself as a lightening in material colour, which is measured as a positive "$\Delta L$" in weathering testing. For unmodified pigmented acrylic/PVC blends the time that this "chalking" occurs is dependent upon the amount of PVC present in the blend, but even at concentrations of <20% w/w PVC a noticeable colour shift ($\Delta E$) occurs after 6000 hours exposure.

It is an object of the present invention to address the above-described problems.

According to a first aspect of the invention, there is provided a polymeric material comprising a halogen-containing polymer which contains between 5 to 70% by wt of halogen and 0.1 to 25% by wt of an inorganic hydroxide of zinc, magnesium, molybdenum, antimony, aluminium, tin, copper, manganese, cobalt or iron.

According to a second aspect, there is provided a method of manufacturing a polymeric material which comprises a halogen-containing polymer which contains between 5 to 70% by wt of halogen and 0.1 to 25% by wt of an inorganic hydroxide of zinc, magnesium, molybdenum, antimony, aluminium, tin, copper, manganese, cobalt or iron, the method comprising melt blending, preferably by extrusion, preferably between 150° C. to 250° C., said halogen-containing polymer and said inorganic hydroxide.

According to a third aspect, there is provided the use of an inorganic hydroxide of zinc, magnesium, molybdenum, antimony, aluminium, tin copper, manganese, cobalt or iron in a polymeric material comprising a halogen-containing polymer which contains between 5 to 70% by wt of halogen for improving the weathering resistance of said halogen-containing polymer, especially their colour stability.

The halogen-containing polymer is preferably a chlorine-containing polymer. The only halogen in said polymer is preferably chlorine. Said polymer may be a polyvinylchloride, polyvinyldichloride, polyvinylidene chloride, chlorinated PVC or chlorinated polyolefin. Said polymer is preferably chosen from a polymer or copolymer of vinyl chloride or vinylidene chloride. A particularly preferred halogen-containing polymer is polyvinyl chloride (PVC). The halogen containing polymer may contain other materials, as known to those skilled in the art, for example pigments, fillers, impact modifiers, lubricants, UV stabilisers, thermal stabilisers and viscosity modifiers. Said halogen containing polymer suitably includes at least 75% by wt of polymer, preferably at least 80% by wt, more preferably at least 90% by wt, especially at least 95% by wt of polymer. Said halogen containing polymer may consist essentially of polymer, especially PVC.

Suitably, the halogen containing polymer, preferably in the absence of any fillers or other ingredients (e.g. thermal stabilisers or viscosity modifiers), includes at least 10% by wt, preferably at least 20% by wt, more preferably at least 30% by wt, especially at least 40% by wt and most preferably at least 45% by wt of halogen, especially chlorine. The halogen containing polymer, preferably in the absence of said aforementioned ingredients, preferably includes less than 70% by wt, preferably less than 60% by wt, especially less than 57% by wt halogen, especially chlorine. Preferably, said halogen containing polymer includes no halogen other than chlorine.

Said polymeric material may include at least 0.5% by wt, suitably at least 0.75% by wt, preferably at least 1% by wt, especially at least 2% by wt, of said inorganic hydroxide. Said polymeric material may include 20% by wt or less, suitably 15% by wt or less, preferably 10% by wt or less of said inorganic hydroxide.

Said inorganic hydroxide may be selected from aluminium hydroxide, zinc hydroxide, iron hydroxide, magnesium hydroxide and tin hydroxide. Said inorganic hydroxide could be antimony hydroxide. Preferably said inorganic hydroxide is selected from magnesium hydroxide, antimony hydroxide, zinc hydroxide and aluminium hydroxide and, of the aforesaid, magnesium hydroxide, antimony hydroxide and zinc hydroxide are preferred. Preferably, said inorganic hydroxide comprises magnesium hydroxide. Preferably, said inorganic hydroxide does not include a material which comprises or consists of aluminium hydroxide. Said inorganic hydroxide may include more than one inorganic hydroxide. However, said inorganic hydroxide preferably consists essentially of magnesium hydroxide.

The weight average particle diameter of particles of said inorganic composition is suitably less than 250 μm, preferably less than 100 μm, more preferably less than 50 μm, especially less than 10 μm, suitably so that the material can have a high surface gloss. In some cases, the diameter may be smaller, for example less than 0.1 μm or below. In this case, the particles may be sufficiently small so that they do not scatter light when incorporated into the acrylic material and, accordingly, clear acrylic materials may be made.

Said polymeric material may include an acrylic polymer. Said acrylic polymer may comprise a homopolymer or a copolymer (which term includes polymers that have more than two different repeat units) of an alkyl(alk)acrylate or a copolymer comprising acrylonitrile, especially a copolymer which includes styrene and acrylonitrile, optionally in combination with other material (especially polymeric material).

Where said acrylic polymer is an alkyl(alk)acrylate, it is preferably a homo or copolymer of at least one $C_1$–$C_6$ alkyl ($C_0$–$C_{10}$alk)acrylate and is more preferably a copolymer made by polymerising a monomer mixture comprising 50–99% wt of an alkyl methacrylate and 1–50% wt of an alkyl acrylate. The alkyl methacrylate is preferably a $C_1$–$C_4$ alkyl methacrylate, for example methyl methacrylate. The alkyl acrylate is preferably a $C_1$–$C_4$ alkyl acrylate, for example methyl, ethyl or butyl acrylate. The molecular weight ($M_W$) of the alkyl(alk)acrylate is preferably at least 20,000 and, more preferably, is at least 50,000. The molecular weight may be 500,000 or less, preferably 200,000 or less, more preferably 150,000 or less.

Where said acrylic polymer is a copolymer comprising acrylonitrile, it may be an acrylic-styrene-acrylonitrile (ASA) polymer, acrylonitrile-EPDM-styrene polymer (AES), styrene-acrylonitrile (SAN) polymer, olefin-styrene-acrylonitrile (OSA) polymer or acrylonitrile-butadiene-styrene (ABS) polymer, with ASA, AES and SAN being preferred.

Suitable copolymers comprising acrylonitrile include at least 15% by wt, more preferably at least 20% by wt, more preferably at least 25% by wt, especially at least 30% by wt of acrylonitrile; and less than 50% by wt, preferably less than 40% by wt, more preferably less than 35% by wt of acrylonitrile.

Suitable copolymers of acrylonitrile include at least 40% by wt, preferably at least 50% by wt, more preferably at least 55% by wt, especially at least 60% by wt styrene; and less than 80% by wt, preferably less than 70% by wt, more preferably less than 65% by wt, of styrene.

Where said polymer comprising acrylonitrile comprises a copolymer comprising acrylonitrile and styrene together with another material, said material may be selected from an olefin, acrylic or EPDM. The amount of the latter mentioned components may be in the range 0 to 20% by wt, preferably 0 to 15% by wt, especially 0 to 10% by wt.

The polymeric material (especially one comprising an acrylic polymer comprising an alkyl(alk)acrylate) may additionally comprise between 0–60 wt %, preferably 20–60 wt % of a rubbery copolymer. By a rubbery copolymer, we mean materials which have a glass transition temperature which is less than room temperature, preferably less than 0° C., e.g. less than –20° C. We also include block copolymers which include a rubbery, low $T_g$ block, often with harder, higher $T_g$ blocks. Such materials are well known for use as toughening agents for improving the impact resistance of acrylic materials. Suitable rubbery copolymers include copolymers of acrylates, methylacrylates, styrene, acrylonitrile and/or olefins (especially butadiene). Examples of suitable materials include styrene—butadiene rubbers, styrene-olefin copolymers, methacrylate-butadiene-styrene (MBS) terpolymers, styrene-acrylonitrile copolymers and core-shell type particles based on methyl methylacrylate and alkyl acrylate copolymers, e.g. butyl acrylate and styrene. Preferred types of rubbery copolymer are core-shell particles such as are well-known in the art and described in e.g. U.S. Pat. No. 5,318,737.

Said polymeric material preferably includes 0.1 to 99.8% by wt of said halogen-containing polymer. Said polymeric material may include at least 2% by wt, suitably at least 5% by wt, preferably at least 10% by wt, more preferably at least 25% by wt, especially at least 30% by wt of said halogen-containing polymer. Said polymeric material may include 80% by wt or less, suitably 70% by wt or less, preferably 60% by wt or less, especially 50% by wt or less of said halogen-containing polymer.

Said polymeric material preferably includes 0.1 to 99.8% by wt of said acrylic polymer. Said polymeric material may include at least 5% by wt, suitably at least 10% by wt, preferably at least 24.9% by wt, more preferably at least 40% by wt, especially at least 60% by wt of said acrylic polymer. Said polymeric material may include 94.9% by wt or less, suitably 90% by wt or less, preferably 80% by wt or less, more preferably 70% by wt or less of said acrylic polymer.

The ratio of the weight of halogen-containing polymer to acrylic polymer in said polymeric material may be at least 0.3, especially at least 0.4. The ratio may be less than 2, preferably less than 1.5, especially less than 1.1. Where the acrylic polymer is ASA and the halogen-containing polymer is PVC, the ratio may be about 1. Where the polymer is an alkyl(alk)acrylate and the halogen-containing polymer is PVC, the ratio may be in the range 0.35 to 0.6, especially 0.4 to 0.5.

Preferably, the halogen containing polymer is compatible with the acrylic polymer in such a way that it can be melt blended to form the polymeric material without undue difficulty.

Other additives such as UV stabilisers, colorants, lubricants etc. that are commonly found in acrylic materials may be present in the polymeric material. The polymeric material may additionally contain one or more inorganic materials selected from oxides, carbonates, borates, stearates, chlorides or bromides of zinc, magnesium, molybdenum, antimony, aluminium, tin, copper, manganese, cobalt or iron. The polymeric material may include between 0.5 and 15% by wt of at least one of the aforesaid inorganic materials, preferably 0.5 –5%.

Said polymeric material suitably includes less than 1 wt %, preferably less than 0.5 wt %, more preferably less than 0.1 wt %, especially substantially no hydrotalcite. Said polymeric material suitably includes less than 1 wt %, preferably less than 0.5 wt %, more preferably less than 0.1 wt %, especially substantially no basic calcium-aluminium-hydroxy carboxylates. Said polymeric material suitably includes less than 1 wt %, preferably less than 0.5 wt %, more preferably less than 0.1 wt %, especially substantially no polyols and/or hydroxyl group-containing isocyanurate.

In a preferred embodiment, the acrylic polymer is melt blended with the inorganic hydroxide at a temperature between 150 to 230° C., more preferably 180 to 220° C. prior to melt blending with the halogen containing polymer. More preferably all of the ingredients are melt blended together between 150 to 230° C., more preferably 160 to 200° C. and particularly 170 to 195° C.

The polymeric material may be made in the form of sheets, film, powders or granules. It may be extruded or moulded into various shapes or coextruded or laminated onto other materials, for example rigid or foamed forms of ABS, PVC, polystyrene polymers including HIPS and other modified styrene polymers, or polyolefins. The material may also be coextruded or laminated onto metals. Material as described in the form of sheets (e.g. coextruded or laminated sheets) may be thermoformed or otherwise formed into a desired shape by a suitable means.

The invention extends to a polymeric material comprising:
a) 0.1 –99.8% by wt of an acrylic polymer;
b) 0.1 –99.8% by wt of a halogen containing polymer which contains between 5 to 70% by wt of halogen;
c) 0.1 to 25% by wt of an inorganic hydroxide of zinc, magnesium, molybdenum, antimony, aluminium, tin, copper, manganese, cobalt or iron.

The invention extends to a method of manufacturing a polymeric material which comprises:
a) 0.1 –99.8% by wt of an acrylic polymer;
b) 0.1 –99.8% by wt of a halogen containing polymer which contains between 5 to 70% by wt of halogen;
c) 0.1 to 25% by wt of an inorganic hydroxide of zinc, magnesium, molybdenum, antimony, aluminium, tin, copper, manganese, cobalt or iron;
which process comprises melt blending, by extrusion, between 150 to 250° C., said acrylic polymer, said halogen containing polymer and said inorganic hydroxide.

The invention extends to the use of an inorganic hydroxide of zinc, magnesium, molybdenum, antimony, aluminium, tin, copper, manganese, cobalt or iron, in a polymeric material which includes a halogen-containing polymer, for improving the weathering resistance of the halogen-containing polymer.

A polymeric material as described herein may be supplied in the form of pellets. The pellets may then be thermally processed for any downstream application. Alternatively where a polymeric material includes an acrylic polymer, a solid form (e.g. pellets) comprising said acrylic polymer and said inorganic hydroxide may be supplied for subsequent mixing with a said halogen-containing polymer Thus, the invention extends to a solid form comprising said acrylic polymer and said inorganic hydroxide, wherein the "% by wt" expressed herein for said acrylic polymer and said inorganic hydroxide represent "parts by weight" in said solid form.

The invention extends to a weather-resistant component comprising an acrylic material according to said first aspect or manufactured in a method according to the second aspect.

Said component may be a coextruded or laminated component which includes said acrylic material.

Said component may be for use in construction.

Said component may be for use in construction of a building. For example, it could be a solid or coextruded building component, for example a soffit board, barge board, fascia board, cladding board, siding, gutter, pipe, shutters, window casement, window board, window profile, conservatory profile, door panels, door casement, roofing panel, architectural accessory or the like.

Said component may be for use in constructing a vehicle or in another automotive application, both as a bulk material or as a coextruded laminate. Such applications include, but are not limited to, decorative exterior trim, cab moldings, bumpers (fenders), louvers, rear panels, accessories for buses, trucks, vans, campers, farm vehicles and mass transit vehicles, side and quarter panel trim or the like.

Said component may be used in applications both indoors or outdoors, for example bathtubs, spas, shower stalls, counters, bathroom fixtures, toilet seats, kitchen housewares, sinks, refrigerator liners or bodies, fencing, trash cans, garden furniture or the like.

The invention further extends to a weather-resistant component for an outdoor application comprising a polymeric material according to said first aspect or manufactured in a method according to the second aspect Outdoor applications include the aforementioned building components and include signage, for example for petrol stations (or the like).

The invention further extends to a weather-resistant extrusion comprising a polymeric material according to said first aspect or manufactured in a method according to the second aspect.

The invention extends to the use of a component made of a polymeric material according to the first aspect or manufactured in a method according to the second aspect in construction and/or in outdoor applications.

The invention extends to a building comprising a component made out of an acrylic material according to the first aspect or manufactured in a method according to the second aspect.

The invention extends to a component which includes a substrate and a capstock material wherein at least one of either the substrate or the capstock material is an acrylic material according to the first aspect or manufactured in a method according to the second aspect.

Any feature of any aspect of any invention or embodiment described herein may be combined with any feature of any aspect of any other invention or embodiment described herein.

The invention will be further described with reference to the following Examples.

EXAMPLE 1

A commercial grade of an impact-modified acrylic moulding copolymer comprising polymethylmethacrylate-co-ethyl acrylate was melt blended with the required amount of uPVC (supplied by EVC Compounds) and magnesium hydroxide of average particle size 5 $\mu$m (supplied by Britmag) as shown in the Table 1. 0.5% w/w UV stabiliser (TINUVIN P from Ciba-Geigy) and 8% w/w colour masterbatch (a 50% pigment dispersion in acrylic) was added to each sample. A Clextral 30 vented twin-screw extruder (general purpose screws, 300 rpm, 190° C.) was used to compound the materials. The materials were coextruded onto foamed uPVC at a thickness of 100 microns.

The samples were tested for weathering performance in accelerated weathering tests using QUV A lamps in a Q-Panel machine following ASTM G53 and xeno arc lamp in a Hereaus 150S machine following ISO 4892. The results after 6000 hours exposure are shown in the Table 1.

The addition of the magnesium hydroxide to acrylic/PVC blends has given a very marked improvement of colour stability under accelerated weathering. The 30% w/w PVC in acrylic blend without $Mg(OH)_2$ shows a colour shift (characterised by the $\Delta E$ value) exceeding 4 units after 6000 hours xeno and 6000 hours QUV A exposure. It also became lightened and "chalky". In contrast, in those samples to which magnesium hydroxide has been added, the $\Delta E$ values are much less after the same exposure time which indicates a much better retention of colour following accelerated weathering.

TABLE 1

| Acrylic copolymer (wt %) | uPVC (wt %) | Mg(OH)$_2$ (wt %) | QUV A ΔE | Xeno 150 S ΔE |
|---|---|---|---|---|
| 70 | 30 | — | 5.8 | 4.5 |
| 65 | 30 | 5 | 1 | 0.6 |
| 60 | 30 | 10 | 0.6 | 0.4 |

EXAMPLE 2

A composition comprising 54.5% by weight of a standard acrylic moulding polymer (Diakon™ MG102 available from Ineos Acrylics), 40% by weight unplasticised PVC, 1% Mg(OH)$_2$, 2% zinc stannate and 2% zinc borate together with 0.5% UV stabiliser (Tinuvin P from Ciba-Geigy) and 0.2% of a thermal stabiliser (Irganox 1076 from Ciba-Geigy) was melt blended as described in Example 1. The weathering properties were measured, together with those of a sample made from colour-matched unmodified uPVC. The results are shown in Table 2.

TABLE 2

| Time (hours) | Modified MG102 QUV A ΔE | uPVC QUV A ΔE |
|---|---|---|
| 1000 | 0.6 | 3.0 |
| 2000 | 1.5 | 3.8 |
| 3000 | 0.2 | 3.8 |
| 4000 | 0.2 | 3.7 |
| 5000 | 0.3 | 3.7 |
| 6000 | 0.7 | 3.1 |

EXAMPLE 3

A composition comprising 36.5% by weight of a commercially available impact modified acrylic moulding compound comprising polymethylmethacrylate-co-ethyl acrylate, 50% by weight unplasticised PVC (available from EVC), 8% colour masterbatch (a 50% pigment dispersion in acrylic) and 5% Mg(OH)$_2$ together with 0.5% UV stabiliser (Tinuvin P from Ciba-Geigy) was melt blended using a Clextral 30 vented twin-screw extruder (general purpose screws, 300 rpm, 190° C.). The pellets thus obtained were injection moulded to form a plaque of nominally 4 mm thickness.

EXAMPLE 4

A composition comprising 11.5% by weight of a commercially available acrylic moulding compound comprising polymethylmethacrylate-co-ethyl acrylate, 75% by weight unplasticised PVC (available from EVC), 8% colour masterbatch (a 50% pigment dispersion in acrylic) and 5% Mg(OH)$_2$ together with 0.5% UV stabiliser (Tinuvin P from Ciba-Geigy) was melt blended and moulded as described in Example 3.

EXAMPLE 5

A composition comprising 86.5% by weight unplasticised PVC (available from EVC), 8% colour masterbatch (a 50% pigment dispersion in acrylic) and 5% Mg(OH)$_2$ together with 0.5% UV stabiliser (Tinuvin P from Ciba-Geigy) was melt blended and moulded as described in Example 3.

EXAMPLE 6

A colour-matched sample of pigmented uPVC and the materials described in examples 3 to 5 were tested for weathering performance using QUV A lamps in a Q-Panel machine following ASTM G53. The results are shown in the Table 3.

TABLE 3

| | QUV A ΔE | | |
|---|---|---|---|
| Material | 250 h | 500 h | 1000 h |
| Example 3 | 0.4 | 0.4 | 0.4 |
| Example 4 | 0.4 | 0.4 | 0.8 |
| Example 5 | 0.7 | 0.7 | 1.1 |
| Pigmented uPVC | 1.4 | 3.0 | 5.3 |

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

What is claimed is:

1. A polymeric material comprising:
   (a) an acrylic polymer selected from the group consisting of a homopolymer of an alkyl (alk)acrylate, a copolymer made by polymerising a monomer mixture comprising 50 to 99% by wt of an alkyl methacrylate and 1 to 50% by wt of an alkyl acrylate, or a copolymer including at least 15% by weight of acrylonitrile;
   (b) a halogen containing polymer which contains between 5 to 70% by wt of halogen;
   (c) 0.1 to 25% by wt of an inorganic hydroxide selected from magnesium hydroxide, antimony hydroxide and zinc hydroxide or mixtures thereof.

2. A polymeric material according to claim 1 wherein the inorganic hydroxide comprises magnesium hydroxide.

3. A polymeric material according to claim 1 wherein the acrylic polymer is present in amount of 0.1 to 99.8% by wt of the polymeric material.

4. A polymeric material according to claim 1 wherein the halogen-containing polymer is present in an amount of 0.1 to 99.8% by wt of the polymeric material.

5. A polymeric material according to any claim 1 wherein the acrylic polymer comprises a homopolymer of a $C_1$–$C_6$ alkyl ($C_0$–$C_{10}$ alk)acrylate.

6. A polymeric material according to claim 1 wherein the acrylic polymer comprises a copolymer made by polymerising a monomer mixture comprising 50 to 99% by wt of an alkyl methacrylate and 1 to 50% by wt of an alkyl acrylate, wherein said alkyl methacrylate is a $C_1$–$C_4$ alkyl methacrylate.

7. A polymeric material according to claim 1 wherein the acrylic polymer comprises a copolymer made by polymerising a monomer mixture comprising 50 to 99% by wt of an alkyl methacrylate and 1 to 50% by wt of an alkyl acrylate, wherein said alkyl acrylate is a $C_1$–$C_4$ alkyl acrylate.

8. A polymeric material according to claim 1 wherein the acrylic polymer comprises a copolymer including at least 15% by weight of acrylonitrile and said copolymer is selected from acrylic-styrene-acrylonitrile (ASA) polymer, acrylonitrile-EPDM-styrene (AES) polymer, styrene-acrylonitrile (SAN) polymer, olefin-styrene-acrylonitrile (OSA) polymer or acrylonitrile-butadiene-styrene (ABS) polymer.

9. A polymeric material according to claim 1 wherein the ratio of the weight of halogen-containing polymer to acrylic polymer in said polymeric material is at least 0.3.

10. A polymeric material according to claim 1 wherein said halogen-containing polymer is selected from a polymer or copolymer of vinylchloride or vinylidene chloride.

11. A polymeric material according to claim 1 wherein said halogen containing polymer includes at least 10% by wt of halogen.

12. A polymeric material according to claim 1 wherein said halogen-containing polymer includes no halogen other than chlorine.

13. A polymeric material according to claim 1 wherein said polymeric material includes at least 0.5% by wt of said inorganic hydroxide.

14. A polymeric material according to claim 1 wherein said polymeric material includes 20% by wt or less of said inorganic hydroxide.

15. A polymeric material according to claim 1 wherein the polymeric material additionally comprises 20 to 60 wt % of a rubbery copolymer.

16. A polymeric material as claimed in claim 1 wherein the polymeric material is in the form of sheets, films, powders or granules.

17. An article of manufacture which is a weather resistant component comprising the polymeric material as defined in claim 1.

18. An article of manufacture which is a weather resistant component as claimed in claim 17 wherein said component is a solid or coextruded building component.

19. A building comprising a component made out of a polymeric material as defined in claim 1.

20. A component which includes a substrate and a capstock material wherein at least one or either the substrate of the capstock material is a polymeric material as defined in claim 1.

21. An article of manufacture comprising the polymeric material as defined in claim 1.

22. A polymeric material comprising:
(a) an acrylic polymer present in an amount of 0.1 to 99.8% by wt based on the total weight of the polymeric material, wherein the acrylic polymer is selected from the group consisting of a homopolymer of a $C_1$–$C_6$ alkyl ($C_0$–$C_{10}$ alk)acrylate, or a copolymer made by polymerising a monomer mixture comprising 50 to 99% by weight of an alkyl methacrylate and 1 to 50% by weight of an alkyl acrylate;
(b) a halogen containing polymer present in an amount of 0.1 to 99.8% by wt based on the total weight of the polymeric material, wherein the halogen containing polymer contains between 5 to 70% by wt of halogen; and
(c) an inorganic hydroxide present in an amount of 0.1 to 25% by wt based on the total weight of the polymeric material, wherein the inorganic hydroxide comprises magnesium hydroxide.

23. A polymeric material as claimed in claim 22 wherein the acrylic polymer comprises said copolymer made by copolymerising a monomer mixture comprising 50 to 99% by weight of an alkyl methacrylate and 1 to 50% by weight of an alkyl acrylate, wherein said alkyl methacrylate is a $C_1$–$C_4$ alkyl methacrylate.

24. A polymeric material as claimed in claim 22 wherein the acrylic polymer comprises said copolymer made by polymerising a monomer mixture comprising 50 to 99% by weight of an alkyl methacrylate and 1 to 50% by weight of an alkyl acrylate, wherein said alkyl acrylate is a $C_1$–$C_4$ alkyl acrylate.

25. A polymeric material as claimed in claim 22 wherein said halogen containing polymer is selected from a polymer or copolymer of vinyl chloride or vinylidene chloride.

26. A polymeric material as claimed in claim 22 wherein said polymeric material additionally comprises 20 to 60 wt % of a rubbery copolymer.

27. A polymeric material as claimed in claim 22 wherein the polymeric material is in the form of sheets, films, powders or granules.

28. An article of manufacture which is a weather resistant component comprising the polymeric material as defined in claim 22.

29. An article of manufacture which is a weather resistant component as claimed in claim 28 wherein said component is a solid or coextruded building component.

30. A building comprising a component made out of a polymeric material as defined in claim 22.

31. A component which includes a substrate and a capstock material wherein at least one or either the substrate of the capstock material is a polymeric material as defined in claim 22.

32. An article of manufacture comprising the polymeric material as defined in claim 22.

33. A method of manufacturing a polymeric material as defined in claim 1, the method comprising melt-blending the acrylic polymer, the halogen-containing polymer and the inorganic hydroxide together at a temperature between 150° C. and 230° C.

34. A method as claimed in claim 33 wherein the acrylic polymer is melt-blended with the inorganic hydroxide prior to melt-blending with the halogen-containing polymer.

35. A polymeric material as claimed in claim 1 wherein the inorganic hydroxide consists essentially of magnesium hydroxide.

36. A polymeric material as claimed in claim 22 wherein the inorganic hydroxide consists essentially of magnesium hydroxide.

* * * * *